US011975951B2

(12) United States Patent
Zhao et al.

(10) Patent No.: US 11,975,951 B2
(45) Date of Patent: May 7, 2024

(54) ENGINEERING MACHINERY AND DYNAMIC ANTI-COLLISION METHOD, DEVICE, AND SYSTEM FOR OPERATION SPACE OF THE ENGINEERING MACHINERY

(71) Applicant: XCMG CONSTRUCTION MACHINERY CO., LTD., Jiangsu (CN)

(72) Inventors: Bin Zhao, Jiangsu (CN); Jian Liu, Jiangsu (CN); Junfei Chai, Jiangsu (CN); Bayona Gómez Alberto, Krefeld (DE); Chuanzheng Hu, Jiangsu (CN)

(73) Assignee: XCMG CONSTRUCTION MACHINERY CO., LTD., Jiangsu (CN)

( * ) Notice: Subject to any disclaimer, the term of this patent is extended or adjusted under 35 U.S.C. 154(b) by 743 days.

(21) Appl. No.: 15/734,430

(22) PCT Filed: Dec. 25, 2018

(86) PCT No.: PCT/CN2018/123604
§ 371 (c)(1),
(2) Date: Dec. 2, 2020

(87) PCT Pub. No.: WO2020/093558
PCT Pub. Date: May 14, 2020

(65) Prior Publication Data

US 2021/0171324 A1 Jun. 10, 2021

(30) Foreign Application Priority Data

Nov. 7, 2018 (CN) ........................ 201811318246.8

(51) Int. Cl.
*B66C 23/90* (2006.01)
*B66C 13/00* (2006.01)
(Continued)

(52) U.S. Cl.
CPC ............ *B66C 23/905* (2013.01); *B66C 13/00* (2013.01); *B66C 13/18* (2013.01); *B66C 23/94* (2013.01)

(58) Field of Classification Search
CPC ....... B66C 23/905; B66C 13/00; B66C 13/08; B66C 13/18; B66C 13/46; B66C 23/94;
(Continued)

(56) References Cited

U.S. PATENT DOCUMENTS 6,985,085 B1 1/2006 Brown
9,030,332 B2 * 5/2015 Tafazoli Bilandi ..... E02F 9/262 348/222.1

(Continued)

FOREIGN PATENT DOCUMENTS

CN 103559703 A 2/2014
CN 103613014 A 3/2014

(Continued)

OTHER PUBLICATIONS

English translation of International Search Report, International Application No. PCT/CN2018/123604, dated Nov. 7, 2018.*

(Continued)

*Primary Examiner* — Andrew Joseph Rudy
(74) *Attorney, Agent, or Firm* — Venable LLP

(57) ABSTRACT

The present disclosure relates to engineering machinery and a dynamic anti-collision method, device, and system for operation space thereof. The dynamic anti-collision method for operation space includes: receiving obstacle information of an obstacle around a boom of engineering machinery and boom motion information of the engineering machinery; determining obstacle coordinates according to the obstacle information and the boom motion information; deciding whether the obstacle coordinates are located in a predetermined early warning area or not; and indicating an execution
(Continued)

device to send out collision warning information in case where the obstacle coordinates are located in the predetermined early warning area.

17 Claims, 6 Drawing Sheets

(51) Int. Cl.
*B66C 13/18* (2006.01)
*B66C 23/94* (2006.01)

(58) Field of Classification Search
CPC .... B66C 23/185; Y02D 10/30; B66D 15/045; B66D 15/065; F16P 3/142; G08B 13/08; G08B 21/24; H04N 7/18
USPC .......................................................... 701/50
See application file for complete search history.

(56) References Cited

U.S. PATENT DOCUMENTS

| | | | | |
|---|---|---|---|---|
| 9,415,976 | B2 * | 8/2016 | Hermann | B66C 15/045 |
| 9,868,618 | B2 * | 1/2018 | Ford | F16P 3/142 |
| 10,570,587 | B2 * | 2/2020 | Kurokami | B60R 1/00 |
| 11,292,700 | B2 * | 4/2022 | Lyngbäck | B66C 13/46 |
| 11,603,294 | B2 * | 3/2023 | Shan | B66C 15/045 |
| 2013/0299440 | A1 | 11/2013 | Hermann et al. | |
| 2013/0345857 | A1 | 12/2013 | Lee et al. | |
| 2015/0329333 | A1 | 11/2015 | Fenker et al. | |
| 2016/0031681 | A1 | 2/2016 | Delplace | |
| 2018/0179029 | A1 | 6/2018 | Schoonmaker | |
| 2019/0345010 | A1 | 11/2019 | Shan et al. | |
| 2020/0140239 | A1 * | 5/2020 | Schoonmaker | H04N 23/54 |

FOREIGN PATENT DOCUMENTS

| | | | |
|---|---|---|---|
| CN | 105303346 | A | 2/2016 |
| CN | 205151606 | U | 4/2016 |
| CN | 207129853 | U | 3/2018 |
| CN | 108732993 | A | 11/2018 |
| CN | 109095356 | A | 12/2018 |
| CN | 209291821 | U | 8/2019 |
| JP | H07112893 | A | 5/1995 |
| JP | 09136781 | A | 5/1997 |
| JP | 2015009954 | A | 1/2015 |
| JP | 6177400 | B1 | 7/2017 |
| JP | 2018030692 | A | 3/2018 |
| WO | 2002058034 | A1 | 7/2002 |
| WO | 2013169941 | A1 | 11/2013 |
| WO | 2018119621 | A1 | 7/2018 |

OTHER PUBLICATIONS

English translation of Japanese document JP 2018030692, Higashi, Kenji (Inventor), Published Mar. 1, 2018.*

English transation of Chinese document CN 103559703 A, Li et al. (Inventors), Published Feb. 5, 2014.*

International Search Report and Written Opinion dated Jun. 19, 2109 in International Application PCT/CN2018/123604.

Extended European Search Report dated Feb. 11, 2022 in European Application No. 18939442.2.

Fang, Yihai, "Real-time safety assistance to improve operators' situation awareness in crane lifting operations", A Dissertation Presented to the Academic Faculty, in Partial Fulfillment of the Requirements for the Degree Doctor of Philosophy in the School of Civil and Environmental Engineering, Georgia Institute, Dec. 1, 2016; pp. 1-119, XP009526238, Retrieved from the Internet: URL:https://smartech.gatech.edu/handle/1853/59143.

Office Action dated Jul. 28, 2023 in Chinese Patent Application No. 201811318246.8.

Ren et al., "Anti-collision during Truck Crane Lifting Based on Virtual Wall", Journal of Mechanical Engineering, Apr. 2015, pp. 161-173, vol. 51, No. 7, School of Information Engineering, Chang 'an University, China.

Chen Ying, "Study of Warning Information Acquisition Technology for Tower Cranes based on Ultrasonic Signals rocessing", May 2010, pp. 1-52, Master Degree Thesis of Xi'an University of Architecture and Technology, China.

* cited by examiner

ENGINEERING MACHINERY AND DYNAMIC ANTI-COLLISION METHOD, DEVICE, AND SYSTEM FOR OPERATION SPACE OF THE ENGINEERING MACHINERY

CROSS-REFERENCE TO RELATED APPLICATIONS

This application is a national stage application, filed under 35 U.S.C. § 371, of International Application PCT/CN2018/123604, filed on Dec. 25, 2018, which claims the benefit of priority to the Chinese patent application No. 201811318246.8 filed on Nov. 07, 2018, which are hereby incorporated by reference in their entireties.

TECHNICAL FIELD

The present disclosure relates to the field of engineering machinery, and in particular to engineering machinery and a dynamic anti-collision method, device, and system for operation space of the engineering machinery.

BACKGROUND

The crane is the most important engineering machinery for lifting operation, but its operation environment is complex and changeable, and its accident rate is high. The main causes of accidents are collisions caused by lifting overload and operation view limitation.

SUMMARY

According to one aspect of the present disclosure, there is provided a dynamic anti-collision method for operation space, comprising: receiving obstacle information of an obstacle around a boom of engineering machinery and boom motion information of the engineering machinery; determining obstacle coordinates according to the obstacle information and the boom motion information; deciding whether the obstacle coordinates are located in a predetermined early warning area or not; and indicating an execution device to send out collision warning information in case where the obstacle coordinates are located in the predetermined early warning area.

In some embodiments of the present disclosure, the receiving obstacle information of the obstacle around the boom of the engineering machinery comprises: receiving obstacle information acquired by an environmental sensing device, the obstacle information including at least one of obstacle information in a boom slewing motion direction or obstacle information in a boom luffing motion direction.

In some embodiments of the present disclosure, the receiving obstacle information of an obstacle around a boom of engineering machinery and boom motion information of the engineering machinery comprises: receiving boom motion information acquired by a boom motion sensing device, wherein the boom motion information comprises at least one of a boom slewing angle, a boom luffing angle, a boom telescopic length or lifting hook position information.

In some embodiments of the present disclosure, the determining obstacle coordinates according to the obstacle information and the boom motion information comprises: filtering the obstacle information according to signal attributes, to eliminate false information and obtain real obstacle information; and fusing the obstacle information and the boom motion information, to convert the real obstacle information into obstacle coordinates of a current boom coordinate system.

In some embodiments of the present disclosure, the dynamic anti-collision method for operation space further comprises: presetting the predetermined early warning area.

In some embodiments of the present disclosure, the presetting the predetermined early warning area comprises: setting the predetermined early warning area around the boom, wherein the predetermined early warning area comprises at least one of an emergency braking area, a danger early warning area or a safety early warning area.

In some embodiments of the present disclosure, the presetting the predetermined early warning area comprises: setting the emergency braking area, the danger early warning area and the safety early warning area respectively around the boom from near to far in the horizontal direction and the vertical direction of the boom.

In some embodiments of the present disclosure, the dynamic anti-collision method for operation space further comprises: indicating the execution device to perform emergency braking on the boom of a crane in case where the obstacle coordinates are located in the emergency braking area.

According to another aspect of the present disclosure, there is provided a dynamic anti-collision device for operation space, comprising: an information fusion module configured to receive obstacle information of an obstacle around a boom of engineering machinery and boom motion information of the engineering machinery; and determine obstacle coordinates according to the obstacle information and the boom motion information; and an anti-collision control module configured to decide whether the obstacle coordinates are located in a predetermined early warning area or not, and indicate an execution device to send out collision warning information in case where the obstacle coordinates are located in the predetermined early warning area.

In some embodiments of the present disclosure, the dynamic anti-collision device for operation space is configured to perform operations to implement the dynamic anti-collision method for operation space according to any one of the above-mentioned embodiments.

According to another aspect of the present disclosure, there is provided a dynamic anti-collision device for operation space, comprising: a memory configured to store instructions; and a processor configured to execute the instructions to cause the dynamic anti-collision device for operation space to perform operations to implement the dynamic anti-collision method for operation space according to any one of the above-mentioned embodiments.

According to another aspect of the present disclosure, there is provided a dynamic anti-collision system for operation space, comprising: an environmental sensing device configured to acquire obstacle information of an obstacle around a boom of engineering machinery and send the obstacle information to a dynamic anti-collision device for operation space; a boom motion sensing device configured to acquire boom motion information of the engineering machinery and send the boom motion information to the dynamic anti-collision device for operation space; the dynamic anti-collision device for operation space according to any one of the above-mentioned embodiments; and an execution device configured to send out collision warning information according to an indication of the dynamic anti-collision device for operation space.

In some embodiments of the present disclosure, the environmental sensing device comprises at least one of: a horizontal detection apparatus configured to scan and detect obstacles in a slewing motion direction of the boom; and a vertical detection apparatus configured to scan and detect obstacles in a luffing motion direction of the boom.

In some embodiments of the present disclosure, the horizontal detection apparatus is arranged on a bottom surface of the boom; and the vertical detection apparatus is arranged on a side face of the boom.

In some embodiments of the present disclosure, the dynamic anti-collision device for operation space is further configured to determine an angle detection range of the vertical detection apparatus according to a ground clearance when the boom is horizontal and a farthest detection distance of the anti-collision system.

In some embodiments of the present disclosure, the boom motion sensing device comprises at least one of a slewing angle sensor, a luffing angle sensor, a telescopic length sensor, or a lifting hook length sensor.

In some embodiments of the present disclosure, the execution device comprises at least one of: a waning apparatus configured to send out corresponding collision warning information in case where the obstacle coordinates are located in different predetermined early warning areas according to the indication of the dynamic anti-collision device of operation space; or a braking apparatus configured to perform emergency braking on the boom of the crane in case where the obstacle coordinates are located in the emergency braking area according to the indication of the dynamic anti-collision device for operation space.

According to another aspect of the present disclosure, there is provided engineering machinery, comprising the dynamic anti-collision device for operation space according to any one of the above embodiments, or comprising the dynamic anti-collision system for operation space according to any one of the above embodiments.

According to another aspect of the present disclosure, there is provided a non-transient computer-readable storage medium, wherein the computer-readable storage medium stores computer instructions that, when executed by a processor, implement the dynamic anti-collision method for operation space according to any one of the above-mentioned embodiments.

BRIEF DESCRIPTION OF THE DRAWINGS

In order to more clearly illustrate the embodiments of the present disclosure or technical solutions in related arts, the drawings used in the description of the embodiments or related arts will be briefly introduced below, it is obvious that the drawings in the description below are only some embodiments of the present disclosure, and for those skilled in the art, other drawings can be obtained according to the drawings without creative efforts.

DETAILED DESCRIPTION

The technical solutions in the embodiments of the present disclosure will be described clearly and completely with reference to the drawings in the embodiments of the present disclosure, and it is obvious that the embodiments described are only some embodiments of the present disclosure, rather than all embodiments. All other embodiments, which can be derived by a person skilled in the art from the embodiments disclosed herein without making any creative effort, shall fall within the protection scope of the present disclosure.

The applicant found that, in order to avoid collisions during the lifting operation, a solution of path planning before lifting is adopted in the related art.

The path planning before lifting is to use the crane as a multi-degree-of-freedom manipulator, establish kinematics and dynamics models thereof, and calculate an anti-collision path thereof in configurable space thereof by an optimization anti-collision algorithm. However, since the search algorithm is generally complex, computer resources are highly required, and it is difficult to implement on a vehicle-mounted controller. In addition, the obstacle model used for path planning before lifting is a static model, but the construction site is a dynamic environment, so the calculated anti-collision path is not consistent with the actual situation.

The applicant also found that, in some embodiments of the related art, collisions between components of the crane are avoided by a guard, which does not take into account the interaction of the lifting arm with the operation space.

In some other embodiments of the related art, the lifting operation space only considers the static model, instead of the dynamic space model, which will cause the missed judgment of the collision state.

In some other embodiments of the related art, the operation space information detection manner does not have all weather, and is greatly influenced by environment, weather, dust and the like.

In some other embodiments of the related art, the possibility of collisions is detected by installing a sensor at a specific position of the operation space. These embodiments are not suitable for dynamically changing construction sites.

In order to solve at least one of the above technical problems, the present disclosure provides a dynamic anti-collision method and system for operation space, which are further described below in combination with specific embodiments.

Figure 1:
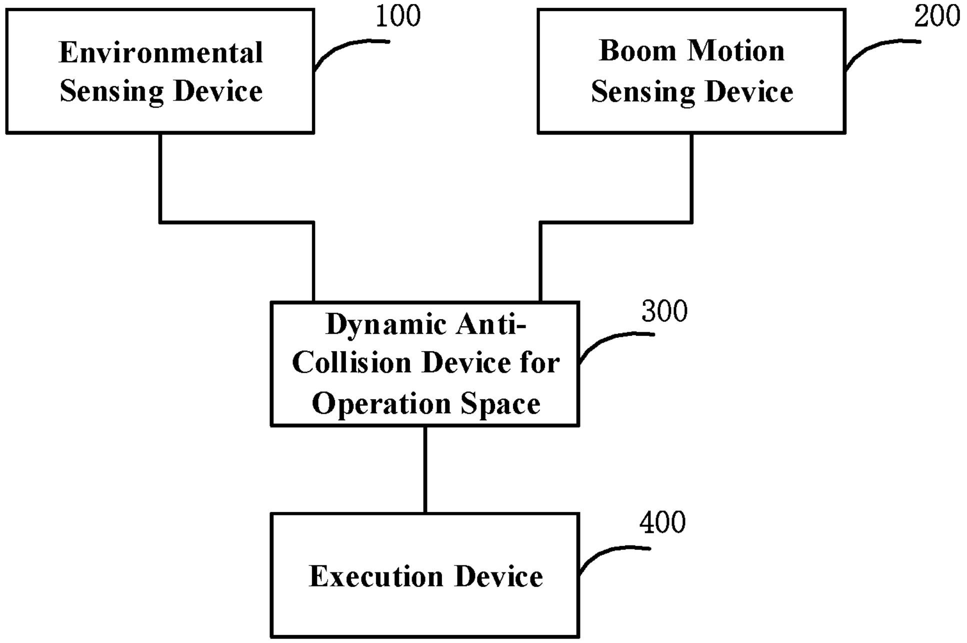
FIG. 1 is a schematic diagram of some embodiments of the dynamic anti-collision system for operation space of the present disclosure.
Figure 2:
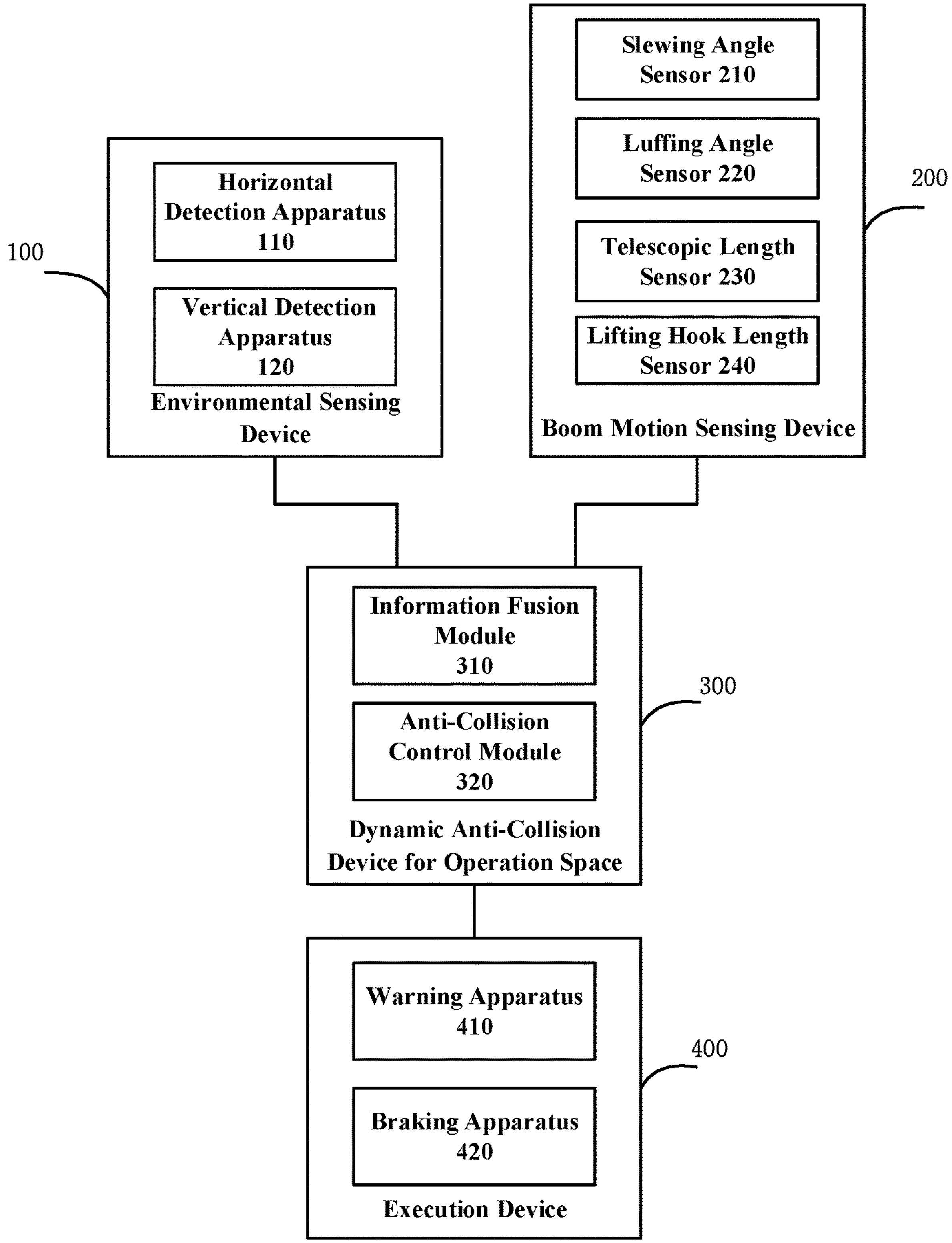
FIG. 2 is a schematic diagram of some other embodiments of the dynamic anti-collision system for operation space of the present disclosure.

FIG. 1 is a schematic diagram of some embodiments of the dynamic anti-collision system for operation space of the present disclosure. FIG. 2 is a schematic diagram of some other embodiments of the dynamic anti-collision system for operation space of the present disclosure. As shown in FIGS.

1 and 2, the dynamic anti-collision system for a workspace may comprise an environmental sensing device 100, an boom motion sensing device 200, a dynamic anti-collision device 300 for operation space, and an execution device 400, wherein the environmental sensing device 100 is connected with the dynamic anti-collision device 300 for operation space, the boom motion sensing device 200 is connected with the dynamic anti-collision device 300 for operation space, and the dynamic anti-collision device 300 for operation space is connected with the execution device 400.

The environmental sensing device 100 is arranged on the boom of the engineering machinery, configured to acquire obstacle information of an obstacle or obstacles around a boom of engineering machinery and send the obstacle information to the dynamic anti-collision device 300 for operation space.

In some embodiments of the present disclosure, the engineering machinery may be a crane.

In some embodiments of the present disclosure, the environmental sensing device 100 may comprise at least one of a horizontal detection apparatus 110 or a vertical detection apparatus 120, wherein the horizontal detection apparatus 110 is configured to scan and detect obstacles in a slewing direction of the boom; and the vertical detection apparatus 120 is configured to scan and detect obstacles in a luffing motion direction of the boom.

In some embodiments of the present disclosure, the horizontal detection apparatus 110 and the vertical detection apparatus 120 may each be implemented as millimeter wave radars. The horizontal detection apparatus 110 may be implemented as a horizontal scanning millimeter wave radar and the vertical detection apparatus 120 may be implemented as a vertical scanning millimeter wave radar.

In some embodiments of the present disclosure, the horizontal detection apparatus 110 and the vertical detection apparatus 120 may also be implemented as at least one of an electromagnetic detection apparatus, a microwave radar sensor, a laser sensor, or an ultrasonic sensor.

The boom motion sensing device 200 is configured to acquire boom motion information of the engineering machinery, and send the boom motion information to the dynamic anti-collision device 300 for operation space.

In some embodiments of the present disclosure, the boom motion information may comprise at least one of a boom slewing angle, a boom luffing angle, a boom telescopic length, or lifting hook position information.

In some embodiments of the present disclosure, as shown in FIG. 2, the boom motion sensing device 200 may comprise at least one of a slewing angle sensor 210, a luffing angle sensor 220, a telescopic length sensor 230, or a lifting hook length sensor 240.

The dynamic anti-collision device 300 for operation space is configured to receive obstacle information of an obstacle or obstacles around a boom of engineering machinery and boom motion information of the engineering machinery; determine obstacle coordinates according to the obstacle information and the boom motion information; decide whether the obstacle coordinates are located in a predetermined early warning area or not; and instruct the execution device 400 to send out collision warning information in the case where the obstacle coordinates are in the predetermined early warning area.

In some embodiments of the present disclosure, the dynamic anti-collision device for operation space may be a vehicle-mounted computer.

In some embodiments of the present disclosure, the dynamic anti-collision device 300 for operation space may also be implemented as a vehicle-mounted controller, a vehicle-mounted display, a vehicle-mounted force limiter, or other electronics with data calculation and analysis functions.

In some embodiments of the present disclosure, the dynamic anti-collision device 300 for operation space may be further configured to set the predetermined early warning area around the boom, wherein the predetermined early warning area may comprise at least one of an emergency braking area, a danger early warning area, or a safety early warning area from near to far from the boom.

The execution device 400 is configured to send out collision warning information according to the indication of the dynamic anti-collision device 300 for operation space.

The above embodiments of the present disclosure may adopt a CAN bus to implement communication between the dynamic anti-collision device 300 for operation space and the environmental sensing device 100, the boom motion sensing device 200, and the execution device 400.

The above embodiments of the present disclosure may also adopt other network patterns with data transmission functions, such as the Ethernet, the Internet, etc., to implement the communication connection between the dynamic anti-collision device 300 for operation space and the execution device 400.

In some embodiments of the present disclosure, as shown in FIG. 2, the execution means 400 may comprise at least one of a warning apparatus 410 or a braking apparatus 420, wherein the warning apparatus 410 is configured to send out corresponding collision warning information in case where the obstacle coordinates are located in different predetermined early warning areas, according to the indication of the dynamic anti-collision device 300 for operation space.

In some embodiments of the present disclosure, the warning apparatus 410 may be implemented as at least one of an acousto-optic warning apparatus, a buzzer, a warning indicator light, or the like.

In some embodiments of the present disclosure, the warning apparatus 410 may comprise a collision information early warning information visual display module and a collision early warning information acousto-optic warning module, wherein the collision information early warning information visual display module is configured to display collision early warning information in real time through a human-computer interaction interface formed by animation, graphics and the like, so that an operator can intuitively know that a collision accident possibly occurs, and thus take corresponding measures; and the collision early warning information acousto-optic warning module is configured to emit a warning sound and a warning light at a different frequency according to the occurrence probability of the collision accident so as to remind an operator of the possible occurrence of the collision accident and prevent the operator from omitting early warning information.

In some embodiments of the present disclosure, the collision early warning information acousto-optic warning module may be implemented as a vehicle-mounted display for sound warning and visual prompt.

In some embodiments of the present disclosure, the acousto-optic warning device may also be implemented as a tablet computer, a vehicle-mounted load notebook computer, or other element with human-computer interaction functions.

In some embodiments of the present disclosure, the warning apparatus 410 may be implemented as a human-computer interaction apparatus. The human-computer interaction apparatus is a color screen display with a touch function, and the human-computer interaction functions exerted by the display are mainly as follows: (1) setting or canceling anti-collision functions of the crane operation space; (2) displaying a distance between the obstacle and a telescopic arm head of the crane or the lifted object in real time in a three-dimensional manner; (3) popping up a dialog box to prompt an operator to pay attention to the current state, and meanwhile, issuing an acousto-optic warning to guarantee the safety of the crane operation, in case where a detection distance is smaller than the safety distance.

The braking apparatus 420 is configured to perform emergency braking on the crane boom in case where the obstacle coordinates are located in the emergency braking area, according to the indication of the dynamic anti-collision device 300 for operation space. The braking apparatus of the above-mentioned embodiment of the present disclosure is configured to perform emergency braking on the crane boom when a collision accident is about to occur, so as to prevent collision from occurrence.

In some embodiments of the present disclosure, the braking apparatus 420 may be implemented as a pump, a valve, a motor, or like braking apparatus.

The braking apparatus 420 and the warning apparatus 410 of the above-mentioned embodiment of the present disclosure perform, upon receipt of a control instruction via the CAN bus, corresponding actions including driving a pump, a valve, a motor, etc., to operate or stop, driving an acousto-optic warning device to open or close, etc., thereby preventing the lifting collision danger from occurrence and ensuring the safety of lifting operation.

On the basis of the dynamic anti-collision system for operation space as provided in the above-mentioned embodiment and particularly a dynamic anti-collision system for lifting operation space of a mobile crane as developed based on the millimeter wave radar technologies, the above-mentioned embodiment of the present disclosure develops an anti-collision algorithm based on real-time dynamic space information and prediction of the interaction behavior of the lifting arm and the operation space, thereby avoiding the missed judgment of the collision state. By using the millimeter wave radar, the above-mentioned embodiment of the present disclosure can adapt various climates, and can detect dynamic space information in rainy and snowy weather, foggy days and dusty environments. The anti-collision device of the above-mentioned embodiment of the present disclosure is mounted on the crane and can operate at any construction site along with the crane.

The above-mentioned embodiment of the present disclosure can detect, in all weather and in real time, the surrounding obstacle conditions during the motion of the boom of the engineering machinery, sense dynamic information of the lifting space, and control the anti-collision early warning, so as to ensure the safety of the engineering machinery during the lifting operation, and reduce the operating intensity of operators.

Figure 3:
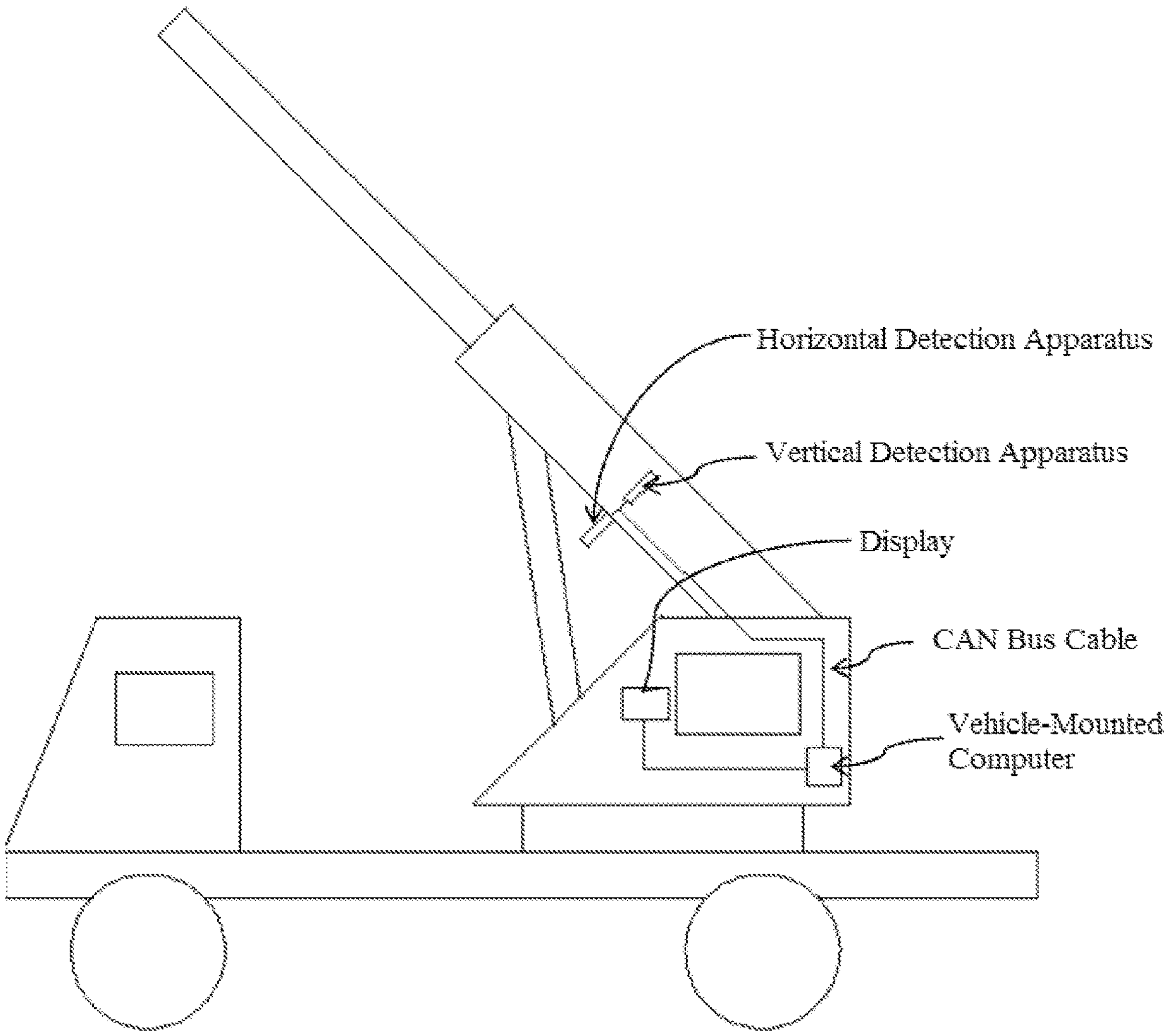
FIG. 3 is an installation schematic diagram of still some other embodiments of the dynamic anti-collision system for operation space of the present disclosure.

FIG. 3 is an installation schematic diagram of still some other embodiments of the dynamic anti-collision system for operation space of the present disclosure. As shown in FIG. 3, the horizontal detection apparatus 110 in the embodiment of FIG. 2 may be arranged on a bottom surface of the boom; the vertical detection apparatus 120 of the embodiment of FIG. 2 may be arranged on a side surface of the boom.

In some embodiments of the present disclosure, the horizontal detection apparatus 110 and the vertical detection apparatus 120 may be implemented as millimeter wave radars.

The above-mentioned embodiment of the present disclosure adopts 2 detection apparatuses, which are distributed at positions of a side surface and a bottom surface of the lifting telescopic arm according to the structural characteristics of the crane. A distribution method of the detection apparatus of the above-mentioned embodiment of the present disclosure makes all objects in the detection space visual, so as to prevent a visual blind area from occurrence, accurately locate a position of any obstacle, and perform planning and modeling on the obstacle with a limit position and a shape.

The above-mentioned embodiment of the present disclosure provides a spatial anti-collision early warning system during a lifting operation of a crane. In particular, the anti-collision function comprises mutual collisions between the crane and the operation environment and mutual collisions between the lifted object and the operation environment. The above-mentioned embodiment of the present disclosure realizes the automatic identification and early warning to a dangerous state by cognizing the surrounding environment and reconstructing a three-dimensional space, wherein reconstructing the three-dimensional space is directed to building mathematical models suitable for computer representation and processing for three-dimensional objects. The three-dimensional space reconstruction in the above-mentioned embodiment of the present disclosure is directed to building a suitable three-dimensional structural model for danger prediction for the obstacle in the lifting operation space.

The above-mentioned embodiment of the invention uses the crane system as a carrier, reasonably distributes mounting positions of detection apparatuses, and develops an algorithm capable of accurately predicting position and shape information of the obstacle. According to the spatial construction principle, it can be learned that coordinate positions of two detection sensors are known and a relative distance of the obstacle from each sensor can be calculated, so that the coordinate position of the obstacle is unique.

FIG. 3 an installation schematic diagram of still some other embodiments of the dynamic anti-collision system for operation space of the present disclosure. As shown in FIG. 3, hardware of the dynamic anti-collision system for operation space consists of a millimeter-wave radar which scans in a horizontal direction, a millimeter-wave radar which scans vertically, a boom motion sensing device, a vehicle-mounted computer, a display, an early-warning buzzer, a warning lamp, related cables and other devices. In particular, two millimeter wave radars are configured to realize the function of the environmental sensing device 100 in the embodiment of FIG. 1 or FIG. 2; the vehicle-mounted computer is configured to realize the functions of the dynamic anti-collision device 300 for operation space in the embodiment of FIG. 1 or FIG. 2; the display, the early-warning buzzer and the warning lamp are configured to realize the functions of the execution device 400 in the embodiment of FIG. 1 or FIG. 2.

As shown in FIG. 3, two millimeter wave radars are mounted at the positions, close to a hinge point of the luffing oil cylinder, of a basic arm of the crane to collect information of the obstacle around the boom. The vehicle-mounted computer, the display, the early-warning buzzer and the warning lamp are mounted in the operation room.

The vehicle-mounted computer is connected with the millimeter wave radar and the boom motion sensing device via the CAN bus for reading millimeter wave radar information and boom motion information, filtering and fusing the information, operating an anti-collision early warning algorithm and outputting corresponding signals and instructions according to anti-collision early warning calculation results.

The early-warning buzzer is connected with an output port of the vehicle-mounted computer via a cable, sounds at different frequencies are emitted according to different warning areas (such as different warning areas in the embodiments of FIGS. 6 and 7), and the closer the distance between the boom and the obstacle is, the faster the frequency of the warning sounds is.

The warning lamp is connected with the output port of the vehicle-mounted computer and emits light with different colors according to the warning area. In some embodiments of the present disclosure, the light color of the early warning area is green, the light color of the dangerous early warning area is yellow, and the light color of the emergency braking area is red, for different warning areas as in the embodiments of FIGS. 6 and 7.

In the above-mentioned embodiment of the present disclosure, the real-time control in the lifting process of the crane is realized by sensing the field environment, calculating the obstacle information of the crane in the lifting path, judging the dangerous state in real time, and giving a warning or performing emergency braking in time.

The above-mentioned embodiment of the present disclosure develops a dynamic anti-collision system for lifting operation space of the mobile crane based on a millimeter wave radar technology. The system avoids the defects of no consideration of interaction between the boom and the space, no consideration of dynamic information of the lifting space, incapability of operation in all weather, need of mounting additional field environmental sensors and the like of related technical systems, is integrated with the crane, can detect situations of obstacles around the crane boom during the motion in all weather and in real time, senses the dynamic information of the lifting space, and can perform the control of anti-collision early warning, so as to ensure the safety of the crane during the lifting operation and reduce the operating intensity of operators.

Figure 4:
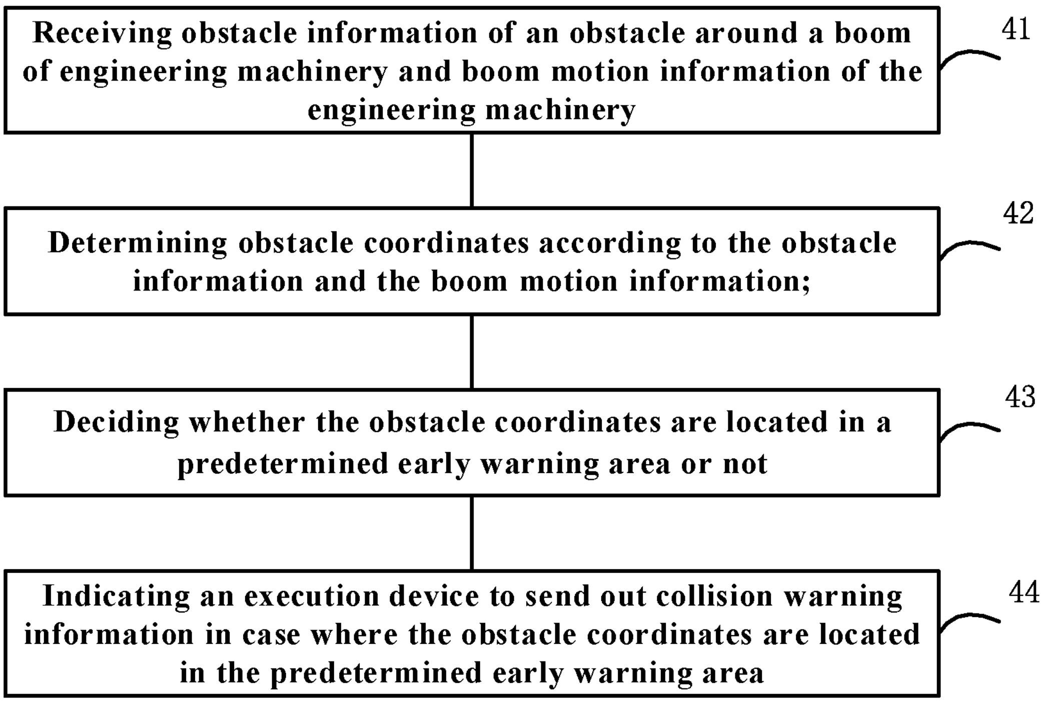
FIG. 4 is a schematic diagram of some embodiments of the dynamic anti-collision method for operation space of the present disclosure.

FIG. 4 is a schematic diagram of some embodiments of the dynamic anti-collision method for operation space of the present disclosure. Preferably, the present embodiment may be implemented by the dynamic anti-collision system for operation space or the dynamic anti-collision device for operation space of the present disclosure. The method comprises steps of Step 41 to Step 44.

In Step 41, obstacle information of an obstacle or obstacles around a boom of engineering machinery and boom motion information of the engineering machinery are received.

In some embodiments of the present disclosure, in Step 41, the step of receiving obstacle information of an obstacle or obstacles around a boom of engineering machinery may comprise: receiving obstacle information acquired by the environmental sensing device 100, the obstacle information including at least one of obstacle information in a boom slewing motion direction or obstacle information in a boom luffing motion direction.

In some embodiments of the present disclosure, in Step 41, the step of receiving the boom motion information of the engineering machinery may comprise: receiving boom motion information acquired by the boom motion sensing device 200, the boom motion information including at least one of a boom slewing angle, a boom luffing angle, a boom telescopic length or lifting hook position information.

In Step 42, obstacle coordinates are determined according to the obstacle information and the boom motion information.

In some embodiments of the present disclosure, Step 42 may comprise Step 421 and Step 422.

In Step 421, the obstacle information is filtered according to signal attributes, to eliminate false information and obtain real obstacle information.

In Step 422, the obstacle information and the boom motion information are fused, to convert the real obstacle information into obstacle coordinates of a current boom coordinate system.

In Step 43, it is decided whether the obstacle coordinates are located in a predetermined early warning area or not.

In Step 44, the execution device 400 is indicated to send out collision warning information in case where the obstacle coordinates are located in the predetermined early warning area.

On the basis of the dynamic anti-collision system for operation space as provided in the above-mentioned embodiment and particularly a dynamic anti-collision system for lifting operation space of a mobile crane as developed based on the millimeter wave radar technologies, the above-mentioned embodiment of the present disclosure develops an anti-collision algorithm based on real-time dynamic space information and prediction of the interaction behavior of the lifting arm and the operation space, so that the missed judgment of the collision state is avoided. By using the millimeter wave radar, the above-mentioned embodiment of the present disclosure can adapt various climates, and can detect dynamic space information in rainy and snowy weather, foggy days and dusty environments. The anti-collision device of the above-mentioned embodiment of the present disclosure is mounted on the crane and can operate at any construction site along with the crane.

Figure 5:
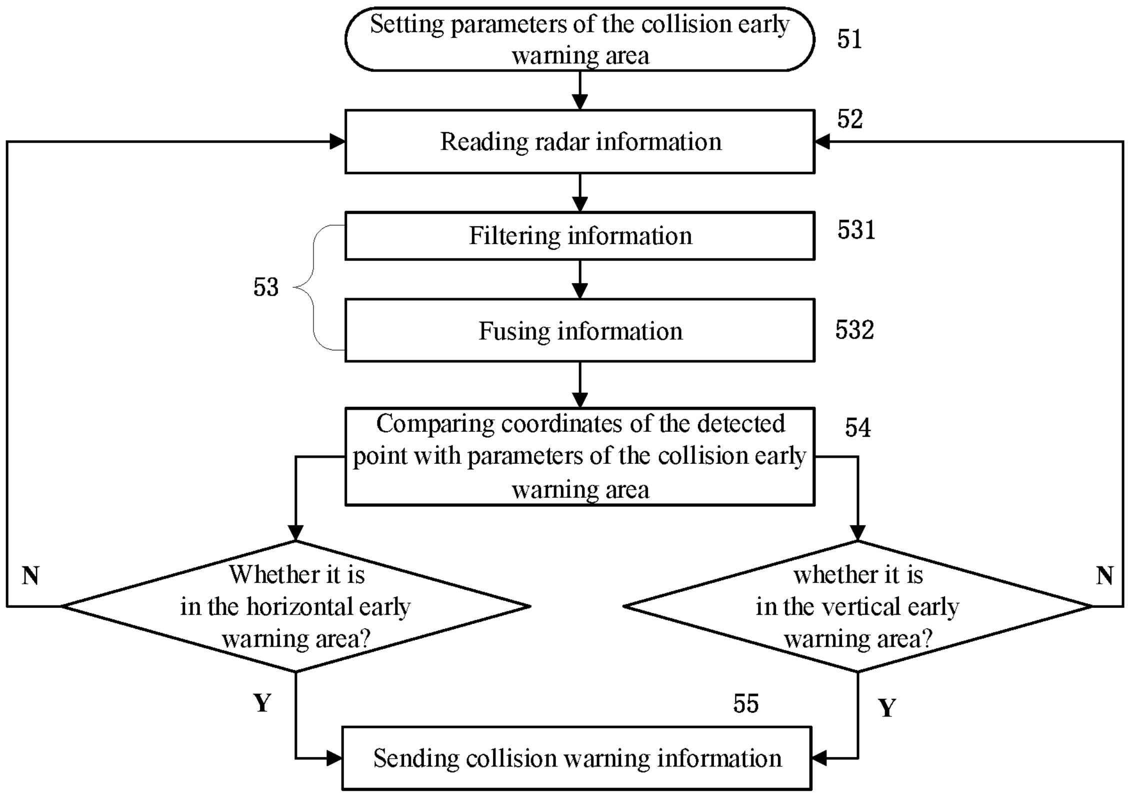
FIG. 5 is a schematic diagram of some other embodiments of the dynamic anti-collision method for operation space of the present disclosure.

FIG. 5 is a schematic diagram of some other embodiments of the dynamic anti-collision method for operation space of the present disclosure. Preferably, the present embodiment may be implemented by the dynamic anti-collision system for operation space or the dynamic anti-collision device for operation space of the present disclosure. The method comprises steps of Step 51 to Step 55.

In Step 51, a predetermined early warning area is preset.

In some embodiments of the present disclosure, Step 51 may comprise: setting the predetermined early warning area around the boom, wherein the predetermined early warning area may comprise at least one of an emergency braking area, a danger early warning area, or a safety early warning area.

Figure 6:
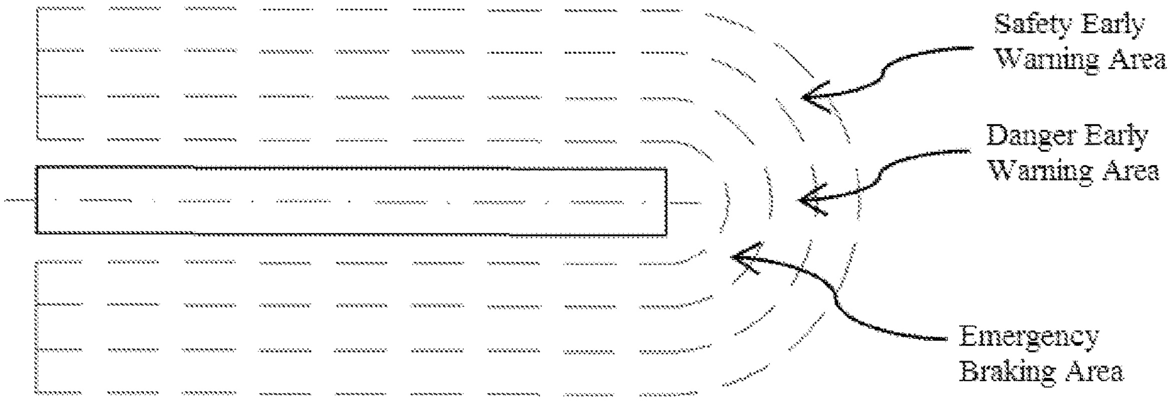
FIG. 6 is a schematic diagram of the horizontal early warning area in some embodiments of the present disclosure.
Figure 7:
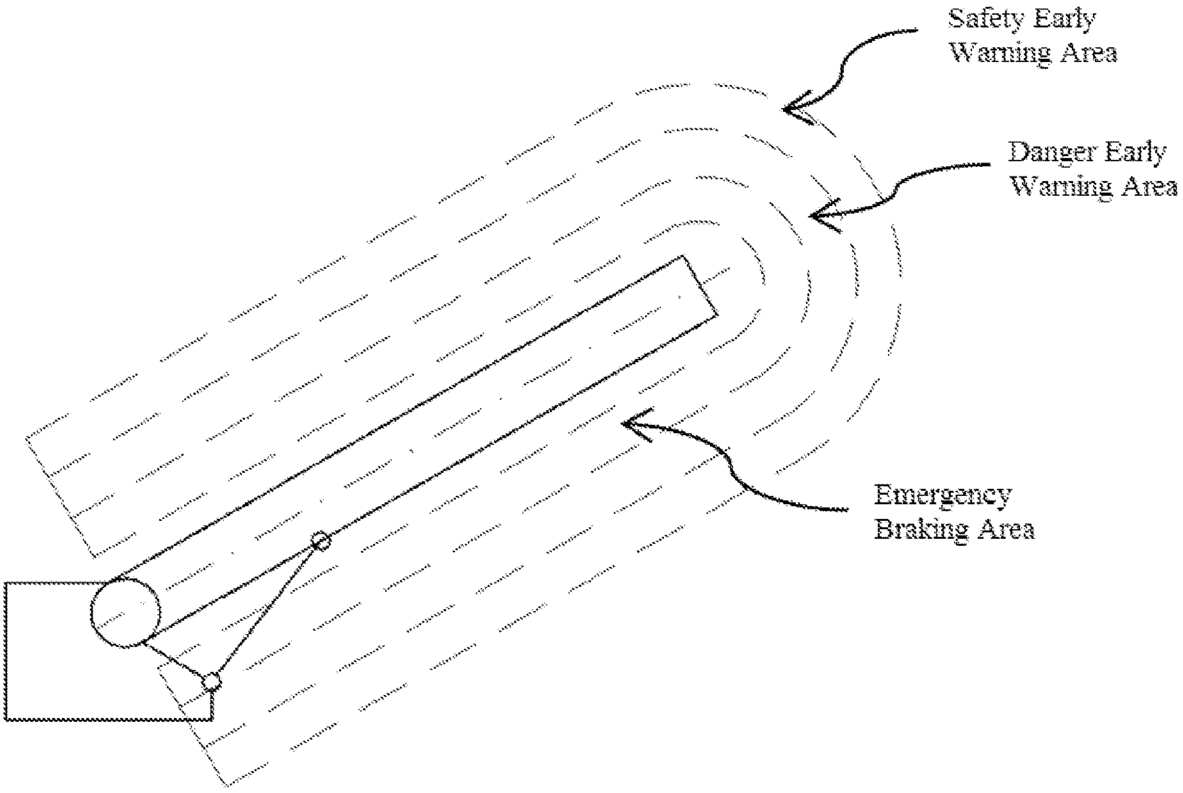
FIG. 7 is a schematic illustration of the vertical early warning area in some embodiments of the present disclosure.

FIG. 6 is a schematic diagram of the horizontal early warning area in some embodiments of the present disclosure. FIG. 7 is a schematic illustration of the vertical early warning area in some embodiments of the present disclosure. As shown in FIGS. 6 and 7, Step 51 of the embodiment of FIG. 5 may comprise Step 511 and Step 512.

In Step 511, the emergency braking area, the danger early warning area and the safety early warning area are set respectively around the boom from near to far in the horizontal direction and the vertical direction of the boom.

In particular, the safety early warning area means that the boom is close to the obstacle, collision between the boom and the obstacle will not occur according to the current speed, and an operator can continue to operate but needs to pay attention all the time. The danger early warning area means that the boom is very close to the obstacle, collision will occur according to the current speed, but a period of time is needed, during which an operator takes a correct operation to avoid collision. The emergency braking area means that the boom is much close to the obstacle, collision will occur immediately according to the current speed, and an operator does not have enough time to react, and thus the controller automatically sends out an emergency stop instruction.

In Step 512, parameters of each warning area are set as shown in FIGS. 6 and 7, wherein the parameters comprise the closest distance and the farthest distance between each warner and the boom, the width of each warning area, and the like.

In Step 52, obstacle information of an obstacle or obstacles around a boom of engineering machinery and boom motion information of the engineering machinery are received.

In some embodiments of the present disclosure, Step 52 may comprise: after the system is started, reading information of the millimeter wave radar and boom motion information acquired by the boom motion sensing device 200, wherein the boom motion information comprises at least one of a boom rotation angle, a boom luffing angle, a boom telescopic length or lifting hook position information.

In Step 53, obstacle coordinates are determined according to the obstacle information and the boom motion information.

In some embodiments of the present disclosure, Step 53 may comprise Step 531 and Step 532.

In Step 531, the obstacle information is filtered according to signal attributes, to eliminate false information and obtain real obstacle information.

In Step 532, the obstacle information and the boom motion information are fused, to convert the real obstacle information into obstacle coordinates of a current boom coordinate system.

In Step 54, it is decided whether the obstacle coordinates are located in a predetermined early warning area or not.

In some embodiments of the present disclosure, as shown in FIG. 5, Step 54 may comprise: comparing the obstacle coordinates with the parameters of the warning area, and respectively deciding whether the obstacle coordinates are located in the horizontal warning area and the vertical warning area.

In Step 55, the execution device 400 is indicated to send out collision warning information in case where the obstacle coordinates are located in the predetermined early warning area.

In some embodiments of the present disclosure, Step 55 may comprise: indicating the execution device 400 to perform emergency braking on the boom of the crane in case where the obstacle coordinates are located in the emergency braking area.

The above-mentioned embodiment of the present disclosure develops a dynamic anti-collision method for lifting operation space of the mobile crane based on a millimeter wave radar technology. The system overcomes the defects of no consideration of interaction between the boom and the space, no consideration of dynamic information of the lifting space, incapability of operation in all weather, need of mounting additional field environmental sensors and the like of related technologies, is integrated with the crane, can detect situations of obstacles around the crane boom during the motion in all weather and in real time, can sense the dynamic information of the lifting space, and can perform the control of anti-collision early warning, so as to ensure the safety of the crane during the lifting operation and reduce the operating intensity of operators.

Figure 8:
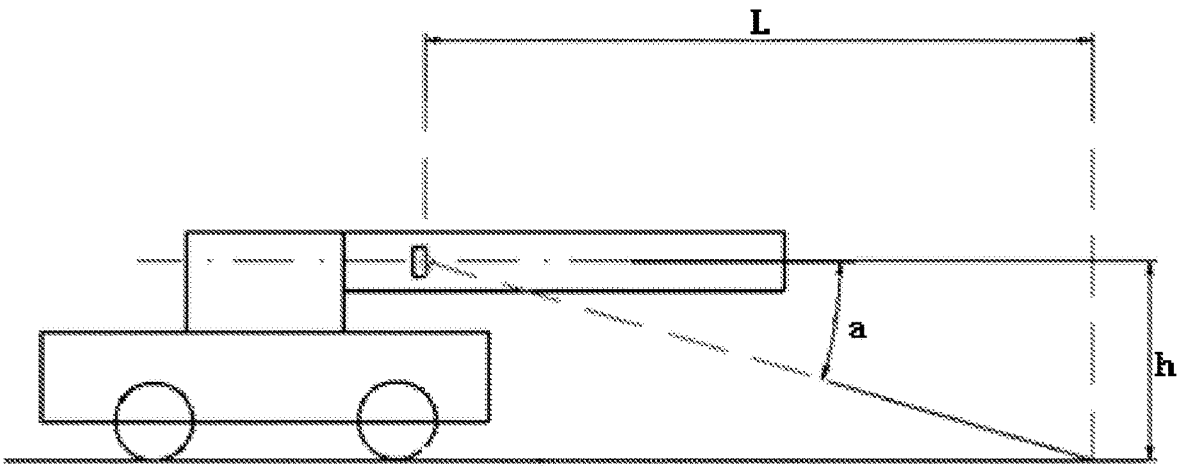
FIG. 8 is a schematic diagram of the method of determining a detection range in a vertical direction in some embodiments of the present disclosure.

FIG. 8 is a schematic diagram of the method of determining a detection range in a vertical direction in some embodiments of the present disclosure. The dynamic anti-collision method for operation space as shown in FIG. 4 or FIG. 5 may further comprise: determining an angle detection range of the vertical detection apparatus 120 according to the ground clearance when the boom is horizontal and the farthest detection distance of the anti-collision system.

The applicant found that, when the radar irradiates the ground, a plurality of clutter waves will be generated due to the multipath reflection effect, so that the calculation of the anti-collision system is influenced.

In order to avoid the influence of multipath reflection, the above-mentioned embodiment of the present disclosure needs to limit the angle of the vertical detection range, and a determination method thereof is shown in FIG. 8. In FIG. 8, h is the ground clearance when the boom is horizontal, and L is the farthest detection distance of the anti-collision system, $\alpha$ is half of the angle range detected by the vertical millimeter wave radar, and can be obtained by the formula (1).

$$\alpha=\arctan(h/L) \quad (1)$$

In some embodiments of the present disclosure, the dynamic anti-collision method for operation space as shown in FIG. 4 or FIG. 5 may further comprise: setting the operating range of the vertical detection apparatus 120 to form a sector area parallel to a side surface of the crane arm along an axial direction of the lifting telescopic arm; and setting the operating range of the horizontal detection apparatus 110 to form a sector area parallel to a bottom surface of the crane arm along an axial direction of the lifting telescopic arm.

The embodiment of FIG. 2 also gives a schematic diagram of some embodiments of the dynamic anti-collision device for operation space of the present disclosure. As shown in FIG. 2, the dynamic anti-collision device 300 for operation space may comprise an information fusion module 310 and an anti-collision control module 320, wherein the information fusion module 310 is configured to receive obstacle information of an obstacle or obstacles around a boom of engineering machinery and boom motion information of the engineering machinery; and determine obstacle coordinates according to the obstacle information and the boom motion information.

In some embodiments of the present disclosure, the information fusion module 310 may be configured to filter radar information according to signal attributes, to eliminate false information and obtain real obstacle information; and fuse the obstacle coordinates and boom motion information, to convert the real obstacle information into obstacle coordinates of a current boom coordinate system.

An anti-collision control module 320 is configured to decide whether the obstacle coordinates are located in a predetermined early warning area; and indicate the execution device 400 to send out collision warning information in case where the obstacle coordinates are located in the predetermined early warning area.

In some embodiments of the present disclosure, the anti-collision control module 320 may be configured to decide a possibility of occurrence of collision according to the obstacle coordinates information and the set warning area information, then make an anti-collision decision according to the judgment result, and output an anti-collision guard control command.

In some embodiments of the present disclosure, the dynamic anti-collision device 300 for operation space is configured to perform operations to implement the dynamic anti-collision method for operation space according to any one of the above-mentioned embodiments (e.g., the embodiment of FIG. 4 or FIG. 5).

Figure 9:
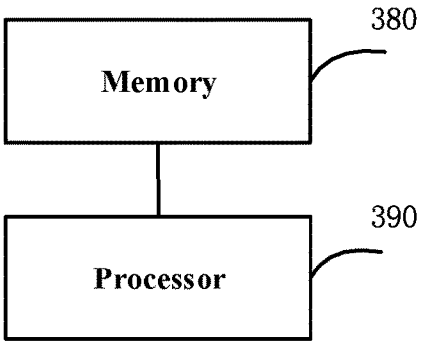
FIG. 9 is a schematic diagram of some embodiments of the dynamic anti-collision device for operation space of the present disclosure.

FIG. 9 is a schematic diagram of some embodiments of a dynamic anti-collision apparatus for operation space of the present disclosure. As shown, the dynamic anti-collision device 300 for operation space of the embodiment of the FIG. 1 or FIG. 2 may comprise a memory 380 and a processor 390, wherein the memory 380 is configured to store instructions; and the processor 390 is configured to execute the instructions to cause the dynamic anti-collision device 300 for operation space to perform operations to implement the dynamic anti-collision method for operation space according to any one of the above-mentioned embodiments (e.g., the embodiment of FIG. 4 or FIG. 5).

Based on the dynamic anti-collision device for operation space provided by the above-mentioned embodiment of the present disclosure, an anti-collision algorithm is developed based on real-time dynamic space information and prediction of the interaction behavior of the lifting arm and the operation space, so that the missed judgment of the collision state is avoided. By using the millimeter wave radar, the above-mentioned embodiment of the present disclosure can adapt various climates, and can detect dynamic space information in rainy and snowy weather, foggy days and dusty environments. The anti-collision device of the above-mentioned embodiment of the present disclosure is mounted on the crane and can operate at any construction site along with the crane.

According to another aspect of the present disclosure, there is provided engineering machinery, comprising a dynamic anti-collision device for operation space according to any one of the above-mentioned embodiments (e.g., the embodiment of FIG. 2 or FIG. 9), or comprising a dynamic anti-collision system for operation space according to any one of the above-mentioned embodiments (e.g., the embodiment of FIG. 1 or FIG. 2).

In some embodiments of the present disclosure, the engineering machinery may be a crane. The dynamic anti-collision system for operation space may be provided with a hydraulic system and an electric control system.

I. Hydraulic System

A motor, an luffing oil cylinder, a telescopic oil cylinder, a slewing motor and the like of the hydraulic system can serve as executing devices to control corresponding mechanisms of the crane to perform corresponding actions.

The hydraulic system may further comprise: a hoisting mechanism of the crane as driven by the motor, configured to lift/drop heavy objects in a vertical direction; a luffing mechanism of the crane as driven by the luffing oil cylinder, configured to change a distance between a hoisted object and the center of a vehicle body; a telescoping mechanism of the crane as driven by the telescopic oil cylinder, configured to extend/shorten a boom; and a slewing mechanism of the crane as driven by the slewing motor, configured to change an operating angle of the crane in the horizontal plane.

II. Electric Control System

The electric control system is provided with a CAN bus network which can provide an information conveyance function for various electric devices.

The electric control system is provided with a vehicle-mounted display with a human-computer interaction function, which can perform danger warning and real-time data display.

The electric control system is provided with a vehicle-mounted controller in charge of data calculation and analysis and control command issuance.

The electric control system is configured with two millimeter wave radars for building a spatial obstacle model.

The engineering machinery provided by the above-mentioned embodiment of the present disclosure overcomes the defects of no consideration of interaction between the boom and the space, no consideration of dynamic information of the lifting space, incapability of operation in all weather, need of mounting additional field environmental sensors and the like of existing systems and technologies, can detect situations of obstacles around the crane boom during the motion in all weather and in real time, can sense the dynamic information of the lifting space, and can perform the control of anti-collision early warning, so as to ensure the safety of the crane during the lifting operation and reduce the operating intensity of operators.

By adding an environmental sensing device such as the millimeter wave radar on the engineering machinery such as the crane, the above-mentioned embodiment of the present disclosure can dynamically scan the surrounding environment, and automatically identify a state in which a collision danger possibly occurs, so as to effectively reduce the occurrence of collision danger of the crane and prolong the service life of the crane.

According to another aspect of the present disclosure, there is provided a non-transient computer-readable storage medium, which stores computer instructions that, when executed by a processor, implement the dynamic anti-collision method for operation space according to any one of the above-mentioned embodiments (e.g., the embodiment of FIG. 4 or FIG. 5).

The above-mentioned embodiment of the present disclosure avoids occurrence of the collision danger caused by the unreachable vision in the lifting operation space. In the above-mentioned embodiment of the present disclosure, the detection apparatus is attached to the crane, and can dynamically and quickly identify the surrounding environment along with the crane, such that a quick identification of a danger source in any operation space of the crane can be ensured. The above-mentioned embodiment of the present disclosure effectively reduces the occurrence of the lifting collision danger, prolongs the service life of the crane, reduces the accident frequency, and ensures the safety of lifting operation.

The dynamic anti-collision device for operation space as described above may be implemented as a general purpose processor, a programmable logic control device (PLC), a Digital Signal Processor (DSP), an Application Specific Integrated Circuit (ASIC), a Field Programmable Gate Array (FPGA) or other programmable logic device, discrete gate or transistor logic, discrete hardware components, or any suitable combination thereof, for performing the functions described herein.

It will be apparent to those skilled in the art that various changes and modifications can be made in the embodiments of the present disclosure without departing from the spirit and scope of the present disclosure. Thus, it is intended that the present disclosure also encompass such modifications and variations as fall within the scope of the claims and their equivalents.

The method and system of the present disclosure may be implemented in a number of ways. For example, the methods and systems of the present disclosure may be implemented in software, hardware, firmware, or any combination of software, hardware, and firmware. The above-described order for the steps of the method is for illustration only, and the steps of the method of the present disclosure are not limited to the order specifically described above unless specifically stated otherwise. Further, in some embodiments, the present disclosure may also be embodied as programs recorded in a recording medium, the programs including machine-readable instructions for implementing the methods according to the present disclosure. Thus, the present disclosure also covers a recording medium storing a program for executing the method according to the present disclosure.

The description of the present disclosure has been presented for purposes of illustration and description, and is not intended to be exhaustive or limited to the present disclosure in the form disclosed. Many modifications and variations will be apparent to practitioners skilled in this art. The embodiment was chosen and described in order to best explain the principles of the present disclosure and the practical application, and to enable others of ordinary skill in the art to understand the present disclosure for various embodiments with various modifications as are suited to the particular use contemplated.

What is claimed is:

1. A dynamic anti-collision method for operation space, comprising:

receiving obstacle information of an obstacle around a boom of engineering machinery and boom motion information of the engineering machinery, wherein the receiving obstacle information of an obstacle around a boom of engineering machinery and boom motion information of the engineering machinery comprises: receiving the obstacle information acquired by an environmental sensing device, wherein the obstacle information comprises at least one of obstacle information in a boom slewing motion direction or obstacle information in a boom luffing motion direction, and wherein the environmental sensing device comprises a horizontal detection apparatus arranged on a bottom surface of the boom and configured to scan and detect obstacles in a slewing motion direction of the boom, and a vertical detection apparatus arranged on a side face of the boom and configured to scan and detect obstacles in a luffing motion direction of the boom;

determining obstacle coordinates according to the obstacle information and the boom motion information;

deciding whether the obstacle coordinates are located in a predetermined early warning area or not; and indicating an execution device to send out collision warning information in case where the obstacle coordinates are located in the predetermined early warning area.

2. The dynamic anti-collision method for operation space according to claim 1, wherein the receiving obstacle information of an obstacle around a boom of engineering machinery and boom motion information of the engineering machinery comprises:

receiving the boom motion information acquired by a boom motion sensing device, wherein the boom motion information comprises at least one of a boom slewing angle, a boom luffing angle, a boom telescopic length or lifting hook position information.

3. The dynamic anti-collision method for operation space according to claim 1, wherein the determining obstacle coordinates according to the obstacle information and the boom motion information comprises:

filtering the obstacle information according to signal attributes, to eliminate false information and obtain real obstacle information; and fusing the obstacle information and the boom motion information, to convert the real obstacle information into obstacle coordinates of a current boom coordinate system.

4. The dynamic anti-collision method for operation space according to claim 1, further comprising:

presetting the predetermined early warning area.

5. The dynamic anti-collision method for operation space according to claim 4, wherein the presetting the predetermined early warning area comprises:

setting the predetermined early warning area around the boom, wherein the predetermined early warning area comprises at least one of an emergency braking area, a danger early warning area or a safety early warning area.

6. The dynamic anti-collision method for operation space according to claim 5, wherein the presetting the predetermined early warning area comprises:

setting the emergency braking area, the danger early warning area and the safety early warning area respectively around the boom from near to far in the horizontal direction and the vertical direction of the boom.

7. The dynamic anti-collision method for operation space according to claim 5, further comprising:

indicating the execution device to perform emergency braking on the boom of a crane in case where the obstacle coordinates are located in the emergency braking area.

8. A dynamic anti-collision device for operation space according to claim 1, comprising:

a memory configured to store instructions; and a processor configured to execute the instructions to cause the dynamic anti-collision device for operation space to perform operations to implement the dynamic anti-collision device.

9. A non-transient computer-readable storage medium according to claim 1, wherein the computer-readable storage medium stores computer instructions that, when executed by a processor, implement the dynamic anti-collision method for operation space.

10. An engineering machinery according to claim 8, comprising a dynamic anti-collision system for operation space, wherein the dynamic anti-collision system for operation space, comprises:

an environmental sensing device configured to acquire obstacle information of an obstacle around a boom of engineering machinery and send the obstacle information to a dynamic anti-collision device for operation space;

a boom motion sensing device configured to acquire boom motion information of the engineering machinery and send the boom motion information to the dynamic anti-collision device for operation space;

the dynamic anti-collision device for operation space; and the execution device configured to send out collision warning information according to an indication of the dynamic anti-collision device for operation space.

11. A dynamic anti-collision device for operation space, comprising:

an information fusion module configured to receive obstacle information of an obstacle around a boom of engineering machinery and boom motion information of the engineering machinery; and determine obstacle coordinates according to the obstacle information and the boom motion information, wherein the receiving obstacle information of an obstacle around a boom of engineering machinery and boom motion information of the engineering machinery comprises: receiving the obstacle information acquired by an environmental sensing device, wherein the obstacle information comprises at least one of obstacle information in a boom slewing motion direction or obstacle information in a boom luffing motion direction, and wherein the environmental sensing device comprises a horizontal detection apparatus arranged on a bottom surface of the boom and configured to scan and detect obstacles in a slewing motion direction of the boom, and a vertical detection apparatus arranged on a side face of the boom and configured to scan and detect obstacles in a luffing motion direction of the boom; and an anti-collision control module configured to decide whether the obstacle coordinates are located in a predetermined early warning area or not; and indicate an execution device to send out collision warning information in case where the obstacle coordinates are located in the predetermined early warning area.

12. The dynamic anti-collision device for operation space according to claim 11, characterized in that, the dynamic anti-collision device for operation space is configured to perform operations to implement the dynamic anti-collision device.

13. A dynamic anti-collision system for operation space, comprising:

an environmental sensing device configured to acquire obstacle information of an obstacle around a boom of engineering machinery and send the obstacle information to a dynamic anti-collision device for operation space;

a boom motion sensing device configured to acquire boom motion information of the engineering machinery and send the boom motion information to the dynamic anti-collision device for operation space;

the dynamic anti-collision device for operation space according to claim 11; and an execution device configured to send out collision warning information according to an indication of the dynamic anti-collision device for operation space.

14. The dynamic anti-collision system for operation space according to claim 13, wherein the dynamic anti-collision device for operation space is further configured to determine an angle detection range of the vertical detection apparatus according to a ground clearance when the boom is horizontal and a farthest detection distance of the anti-collision system.

15. The dynamic anti-collision system for operation space according to claim 1, wherein the boom motion sensing device comprises at least one of a slewing angle sensor, a luffing angle sensor, a telescopic length sensor, or a lifting hook length sensor.

16. The dynamic anti-collision system for operation space according to claim 13, wherein the execution device comprises at least one of:

a warning apparatus configured to send out corresponding collision warning information in case where the obstacle coordinates are located in different predetermined early warning areas according to the indication of the dynamic anti-collision device of operation space; or a braking apparatus configured to perform emergency braking on the boom of the crane in case where the obstacle coordinates are located in the emergency braking area according to the indication of the dynamic anti-collision device for operation space.

17. An engineering machinery, comprising a dynamic anti-collision device for operation space, wherein the dynamic anti-collision device for operation space, comprises:

an information fusion module configured to receive obstacle information of an obstacle around a boom of engineering machinery and boom motion information of the engineering machinery; and determine obstacle coordinates according to the obstacle information and the boom motion information, wherein the receiving obstacle information of an obstacle around a boom of engineering machinery and boom motion information of the engineering machinery comprises: receiving the obstacle information acquired by an environmental sensing device, wherein the obstacle information comprises at least one of obstacle information in a boom slewing motion direction or obstacle information in a boom luffing motion direction, and wherein the environmental sensing device comprises a horizontal detection apparatus arranged on a bottom surface of the boom and configured to scan and detect obstacles in a slewing motion direction of the boom, and a vertical detection apparatus arranged on a side face of the boom and configured to scan and detect obstacles in a luffing motion direction of the boom; and an anti-collision control module configured to decide whether the obstacle coordinates are located in a predetermined early warning area or not; and indicate an execution device to send out collision warning information in case where the obstacle coordinates are located in the predetermined early warning area.

* * * * *